Inventors: David Saville Muzzey, Jr.
Robert Du Wayne Miller
By their Attorney:

Inventors: David Saville Muzzey, Jr.
Robert Du Wayne Miller
By their Attorney:

Nov. 28, 1944.  D. S. MUZZEY, JR., ET AL  2,363,987
APPARATUS FOR ELECTRICAL EXPLORATION
Filed Sept. 8, 1941  5 Sheets-Sheet 4

Inventors: David Saville Muzzey, Jr.
Robert Du Wayne Miller

By their Attorney:

Nov. 28, 1944.   D. S. MUZZEY, JR., ET AL   2,363,987
APPARATUS FOR ELECTRICAL EXPLORATION
Filed Sept. 8, 1941   5 Sheets-Sheet 5

Inventors: David Saville Muzzey, Jr.
Robert Du Wayne Miller
By their Attorney:

Patented Nov. 28, 1944

2,363,987

UNITED STATES PATENT OFFICE 2,363,987

APPARATUS FOR ELECTRICAL EXPLORATION

David Saville Muzzey, Jr., and Robert Du Wayne Miller, Houston, Tex., assignors to Shell Development Company, San Francisco, Calif., a corporation of Delaware Application September 8, 1941, Serial No. 410,010

3 Claims. (Cl. 175—182)

This invention relates to a system of synchronous commutation, and has particular application in methods of geophysical exploration of underground formations, wherein an electric current commutated by electronic means is passed through the earth strata between grounded current electrodes, while the potential difference generated in the earth by said current, or due to other causes, is measured between grounded potential electrodes by means of suitable indicating devices.

In exploring the ground by means of commutated direct current, it is customary to use so-called synchronous commutators, adapted to reverse in synchronism, and at a desired frequency, the connections between the source of current and the current electrodes, and the connections between the indicating devices and the potential electrodes.

The mechanical commutators used for this purpose and described, for example, in U. S. Patents, 1,813,845 and 2,204,436, are, however, inherently subject to considerable drawbacks, such as difficulties in mechanically maintaining a frequency of highly constant order which is essential for purposes of geophysical exploration; relatively small range of permissible frequencies, as a mechanical commutator gives satisfactory operation in exploration work only near the frequency for which it has been designed; sparking difficulties, which are usually aggravated with time and wear, and which give rise to undesirable transient effects; insufficiently fast switching, giving an undesirably long current-off time and resulting in an imperfect square-shape wave form, etc.

It is therefore an object of this invention to provide for purposes of electrical exploration an electronic commutator free of the above defects.

It is also an object of this invention to provide an electronic commutator capable of delivering a commutated current of highly constant frequency, controlled by means such, for example, as a tuning fork.

It is also an object of this invention to provide an electronic commutator of flexible frequency characteristics, capable of delivering commutated currents of different predetermined constant frequencies within a very wide range, such as from about one-half to about 25 cycles or more.

It is also an object of this invention to provide an electronic commutator capable of extremely fast switching action, whereby current-off time periods may be reduced to extremely small values, such as 0.001 second.

There and other objects and features of this invention will be understood from the following description taken with reference to the attached drawings, wherein.

Figure 1:
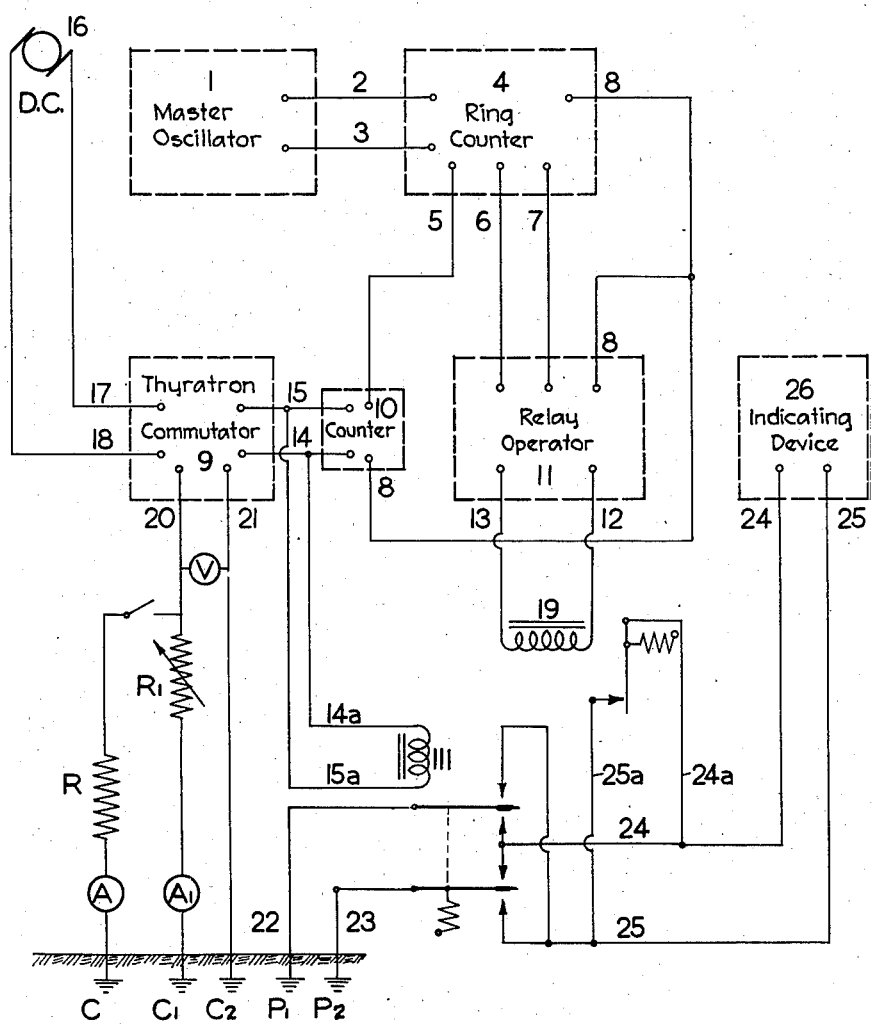
Fig. 1 is a diagram showing the general arrangement of the electrical elements and units forming the system of the present invention.

The manner in which the present system may be used for purposes of electrical exploration may be seen from Fig. 1, which shows diagrammatically the general arrangement of the units or elements forming said system.

A source of direct current, such as a generator or battery 16 is connected to grounded current electrodes $C_1$ and $C_2$ through a commutator unit or circuit 9, it being understood that more than one electrode may be connected to either or both output terminals of said unit by means of switches or other suitable connections, as shown, for example, at C.

Grounded potential electrodes $P_1$ and $P_2$, which may be placed in any desired position with regard to the current electrodes to detect the potentials induced in the ground by the current flowing therethrough between electrodes $C_1$ and $C_2$, are connected to an indicating device 26 by means of a relay operated double-pole, double-throw switch generally indicated at 111, the indicating device being also provided with a short-circuiting relay operated switch generally indicated at 19.

Suitable indicating instruments, resistances or impedances shown at A, $A_1$, V, R and $R_1$ may be inserted in the circuit of the current electrodes to indicate and to vary the potentials and intensity of the current flowing between said electrodes, as will be readily understood by those familiar with electrical exploration methods.

Actuating impulses for the operation of the commutator 9 and switches 111 and 19 are provided by a master oscillator unit 1, which may have its own supply of electric power, or may derive said power from source 16. Said impulses are applied to the commutator 9 and relays 111 and 19 through a ring counter unit 4, counter unit 10 and relay operator unit 11.

If the present system is used according to a method such as described in U. S. Patent 2,172,557, wherein only current electrodes are used for exploration purposes, that part of the above circuit comprising electrodes $P_1$ and $P_2$, relay operator 11, switches 111 and 19 and indicating device 26 may be dispensed with.

The master oscillator unit shown at 1, which may be of the relaxation type as will be described hereinbelow, furnishes sharp voltage pulses at a frequency which is controlled and may be maintained at a predetermined constant value by the operator. The character of the pulses from the master oscillator 1 is shown at $a$ in Fig. 1A.

The voltage pulses from the master oscillator 1 are transmitted over lines 2 and 3 to a ring counter unit 4. The ring counter unit 4 sends voltage pulses over line 8 and lines 5, 6 and 7 in sequence, line 8 being common to the circuits of the three lines 5, 6 and 7. The pulses from ring counter 4 are each initiated by a pulse from the oscillator 1, and follow each other in continued succession at intervals which are integral multiples of the intervals between pulses originating in oscillator 1. For example, with one specific arrangement of the ring counter unit 4, the first pulse from oscillator 1 will initiate a short duration pulse between conductors 5 and 8, the second pulse will initiate similarly a pulse between conductors 6 and 8, and the third a pulse between 7 and 8, after which the cycle will repeat itself, so that there will be a short duration voltage pulse between wires 5 and 8 on the first, fourth, seventh, tenth, etc., pulses from the master oscillator, similar pulses between wires 6 and 8 on the second, fifth, eighth and eleventh, etc., master oscillator pulses, and between wires 7 and 8 on the third, sixth, ninth and twelfth, etc., master oscillator pulses as shown at $b$, $c$ and $d$ in Fig. 1A. It is understood that this description refers to the simplest example of the action of the ring counter unit, and that by using more tubes in said unit, any other timing intervals and sequences may be provided, as will be explained in describing the detailed arrangement of the master oscillator and ring counter units.

The short duration pulses over lines 5—8 from ring counter 4 act on a counter 10 for alternately turning on and off current pulses which are fed from said counter 10 to a thyratron commutator 9 and a relay 111 over lines 14—15 and 14a—15a, respectively. Each of the pulses from counter 10 lasts therefore over a period of time equal to the time between two consecutive short pulses over lines 5—8 from ring counter 4, and the interval between them is also equal to the time between two consecutive pulses over lines 5—8, as shown at $e$ in Fig. 1A.

The sharp rise in current in lines 14—15 at the beginning of each of these pulses, and the sharp fall in current at the end of each pulse each initiate the reversal operations in the thyratron commutator 9 which is a controlled inverter for commutating the direct current supplied thereto over lines 17—18 from the D. C. generator 16 into a substantially square wave-shape alternating current which is then led over lines 20—21 to current electrodes $C_1$ and $C_2$.

The current pulses originating in counter 10 also serve to actuate the double-pole, double-throw relay 111, to which they are conveyed over lines 14a—15a. When current is flowing in lines 14a—15a, the relay 111 operates to connect the leads 22 and 23 from the potential electrodes $P_1$ and $P_2$ with the leads 25 and 24, respectively, of the indicating device 26. When no current flows in lines 14a—15a, the armature of relay 111 springs back to connect elements 22 and 23 with elements 24 and 25, respectively, thereby reversing the connections between the potential electrodes and the indicating device. In this manner, pulses originating in counter 10 simultaneously or in synchronization commutate the current supplied to the current electrodes by thyratron commutator 9, and reverse the connections of the potential electrodes to the indicating device.

The short duration voltage pulses over lines 6—8 and 7—8 are transmitted from ring counter 4 to a relay operator 11. The relay operator 11, in response to a pulse over lines 7—8, sends out a current pulse over lines 12—13 to a relay 19, which pulse lasts until a short duration pulse is received by the relay operator 11 over lines 6—8. During the interval between the arrival of the pulse over lines 6—8 and the arrival of the next pulse over lines 7—8, no current flows over lines 12—13 to the relay 19. When current is supplied to relay 19, the normally open contact of this relay is closed, short-circuiting the indicating device 26 through lines 24a and 25a. Thus the indicating device 26 is made inoperative during the interval between the arrival to the relay operator 11 of a pulse over lines 7—8 and that of a pulse over lines 6—8. This inoperative period covers the instant during which the main current from generator 16 is reversed by the thyratron commutator 9 and the connections to the indicating device are switched by the relay 111, namely, the instant at which a pulse is sent by ring counter 4 over lines 5—8. This short-circuiting action extending over a period covering the switching operations prevents transient effects associated with these operations from disturbing the indicating device.

Figure 1A:
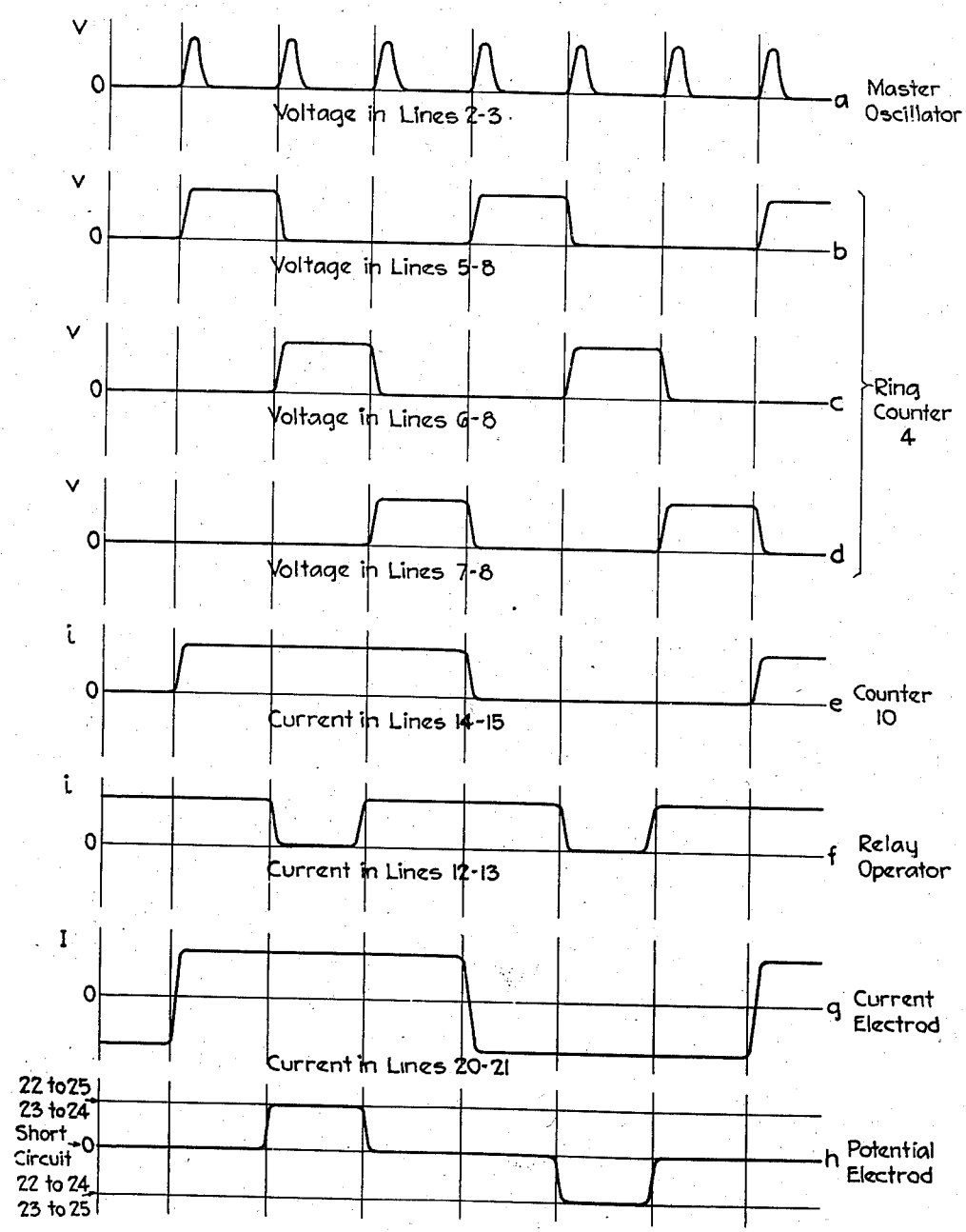
Fig. 1A is a graph showing the relationship in time and the wave form of the pulses produced in the several units of the present system.

The cooperation between the various effects obtaining in this commutation system may perhaps be better understood with reference to Fig. 1A, giving a graph of the nature and relationship in time of the pulse outputs of the several component units of the system. The common abscissa for all the graphs used in Fig. 1A is time. The ordinates represent the voltage impressed across the lines, as shown, or the current flowing therein.

The upper graph, $a$, shows the timing and approximate shape and duration of the voltage pulses supplied by the master oscillator 1 to the ring counter 4 over lines 2—3.

Graphs $b$, $c$ and $d$ show the timing and approximate shape and duration of the voltage pulses supplied by the ring counter 4 over lines 5—8, 6—8, and 7—8, respectively.

Graph $e$ shows the timing and approximate duration of the current pulses sent by the counter 10 over lines 14, 15, 14a and 15a.

Graph $f$ shows the timing, shape and duration of the current pulses sent by the relay operator 11 over lines 12—13.

Graph $g$ shows the timing and approximate wave form of the commutated current fed from the thyratron commutator 9 to the current electrodes $C_1$ and $C_2$ over lines 20—21.

Finally, graph $h$ shows the timing of the connections of lines 22—23 from potential electrodes $P_1$ and $P_2$ to lines 24—25 from the indicating device resulting from the action of relays 111 and 19.

With the above general description of the whole system, and of the purpose and role of each component unit in mind, the organization and operation of said component units will be described with regard to preferred embodiments thereof, it being understood that there may be several ways in which each of said units may be constructed to fulfill its purpose, as will be obvious to those skilled in the art of electronics.

Figure 2:
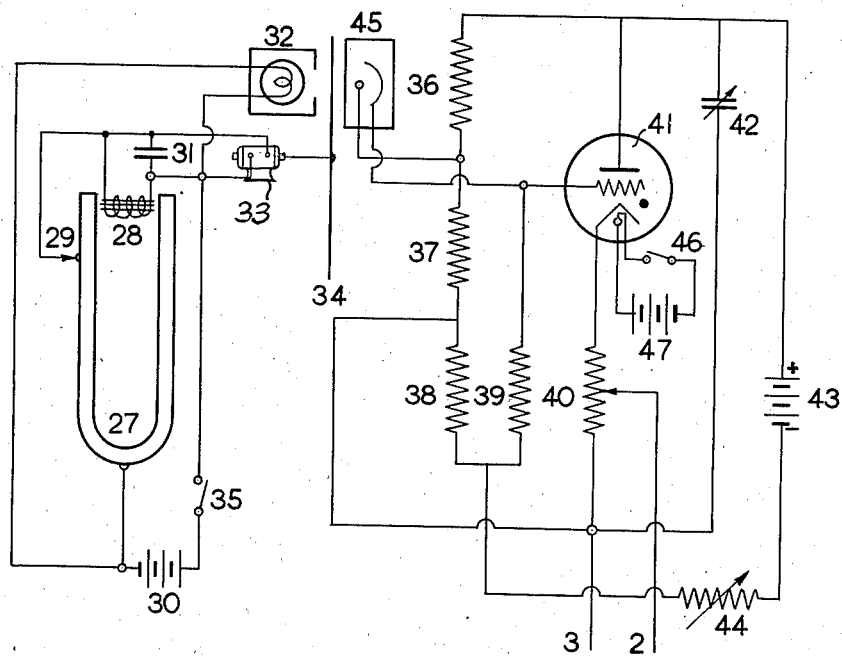
Fig. 2 is a circuit diagram of the master oscillator unit shown at 1 in Fig. 1.

Fig. 2 is a circuit diagram of a relaxation oscillator unit, such as shown at 1 in Fig. 1, whose frequency is kept constant by means of tuning fork control at a value which may be changed by the operator.

A tuning fork 27 is maintained in vibration at its natural frequency by means of a battery or cell 30, contact 29, electromagnet 28 and condenser 31 in a manner well known to electrical engineers. A synchronous motor 33 is connected across coil 28 and condenser 31 to run in synchronism with the vibrations of the fork.

Figure 2A:
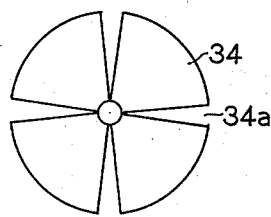
Fig. 2A is a face view of the disc shown at 34 in Fig. 2.

A circular disc 34, mounted on the shaft of the synchronous motor 33, is provided with a number of preferably equal and equally spaced openings, such for example, as the sector-shaped gaps 34a, shown in Fig. 2A. The rotation of disc 34 alternately allows a light beam from a lamp 32 to fall on a photoelectric cell 45, which may be of the gas-filled type, or blocks this beam off.

Resistors 36, 37, 38 and 39, in circuit with said photocell, are selected of such values that when photocell 45 is not illuminated, the grid of the arc discharge tube 41, which may be a small thyratron, has a sufficiently negative value to prevent its discharging at the plate potential available from battery 43. However, when the photocell 45 is illuminated by the lamp 32, the resistance of the photocell is considerably decreased, thereby decreasing the negative bias on the grid of tube 41, so that it will discharge if a condenser 42, connected as shown between the plate and the filament of tube 41 has had time to charge up to sufficient voltage since the previous discharge. This discharge is quickly quenched by the action of the condenser 42, which drops the potential across the tube 41 to a value lower than the drop in the arc of the tube, so that the arc is stopped. A new discharge will not occur until both of the following conditions are satisfied: (1) The battery 43 has charged the condenser 42 through the shown network of resistances, and (2) the photocell 45 is again illuminated.

The time necessary for the charging of the condenser 42 is given by a well-known exponential function of the product of a resistance involving values of resistances 38, 44, 36 and 37 by the capacity of the condenser 42.

If the capacity of condenser 42 is increased, this time is increased, and vice versa. In practice, the capacity of the condenser 42 may be set so that it is fully charged during the time interval between two successive illuminations of photocell 45 through the openings in disc 34. In such case, the tube 41 will fire or ignite for every passage of a slot in disc 34 by photocell 45. It will be apparent that if the capacity of condenser 42 is increased so that it does not charge sufficiently during the time interval between the passage of two successive slots in disc 34 by the photocell 45, the thyratron 41 will fire only on every second illumination of photocell 45.

In this manner, since every firing of tube 41 produces a voltage pulse across resistor 40, and hence across output lines 2 and 3, it is possible to obtain pulses from the apparatus which are timed by the slots in the disc 34 and may occur at the frequency of the passage of these slots by the photocell 45, or at one-half, one-third, or other fraction of this frequency.

It is, however, not advisable to reduce the frequency of the system in this manner beyond the fifth or the sixth subharmonic of the basic slot passage frequency, because small variations in the resistors 38, 44, 36 and 37, or the condenser 42, or the constants of tube 41 can then cause variations or irregularities in the firing interval. If further frequency changes are desired, they can be obtained by replacing disc 34 with a disc having a different number of openings. For example, if the natural frequency of the tuning fork 27 is 60 cycles per second, and if the synchronous motor 33 makes five revolutions per second when controlled by a 60 cycle current, then a disc with 12 slots will maintain the oscillator at 60 cycles per second if the circuit constants are adjusted to produce firing at every slot passage, or at 30 cycles if firing occurs at every other slot passage, or at 20 or 15 cycles, etc., in submultiples of 60 cycles. By substituting a disc with 10 slots for the 12-slot disc, the oscillator frequency can be maintained constant in the same manner at 50 cycles or its larger subharmonics, such as 25, 16⅔, 12½, 10, etc., cycles per second.

Figure 3:
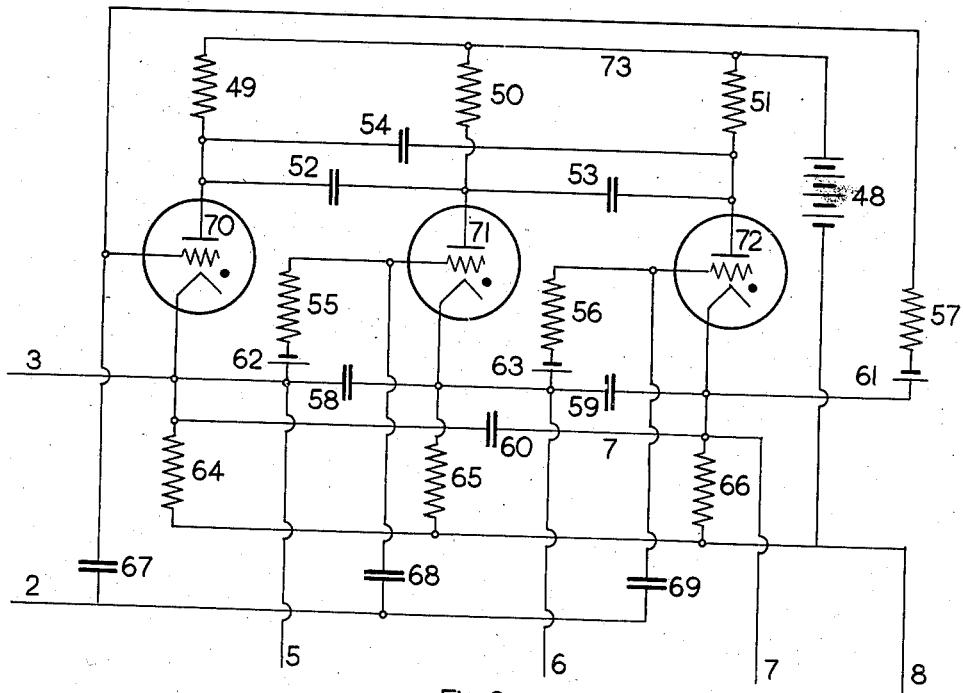
Fig. 3 is a circuit diagram of the ring counter unit shown at 4 in Fig. 1.

Fig. 3 shows an arrangement of the ring counter circuit 4 of Fig. 1, connected by leads 2 and 3 to the master oscillator 1 of Fig. 2. Tubes 70, 71 and 72 are small thyratrons, such for example, as the commercial tubes 884 or 885. Assume tube 70 to be firing. The flow of current through resistor 64 causes a voltage drop which gives the grid of tube 71 a bias of sufficiently positive value to cause said tube 71 to fire when the next pulse arrives from the master oscillator 1 to make lead 2 positive with regard to lead 3. The firing of tube 71 extinguishes the tube 70 by means of condenser 52, in a manner well understood in electronics engineering. The grid of tube 72 now in turn becomes biased to a sufficiently positive value by the current flow through resistor 65 to permit said tube 72 to fire upon the arrival of the next positive pulse on lead 2 with respect to lead 3, which firing of tube 72 will extinguish tube 71 by means of condenser 53. The grid of tube 70 now in its turn becomes positively biased by the current flow through resistor 66, thereby permitting said tube to fire upon the next positive pulse on lead 2, with regard to lead 3, and extinguishing tube 72. The firing of tubes 70, 71 and 72 in the cyclical order described above furnishes voltage pulses across resistors 64, 65 and 66, respectively, which are fed over lines 5—8, 6—8 and 7—8 to counter 10 and relay operator 11.

Figure 4:
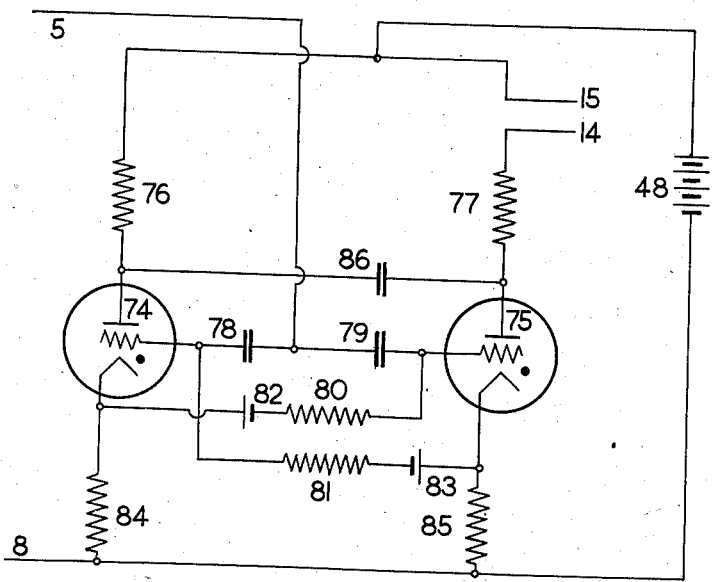
Fig. 4 is a circuit diagram of the counter unit shown at 10 in Fig. 1.

Fig. 4 shows the arrangement of the counter 10 of Fig. 1, connected by leads 5 and 8 to the ring counter 4 of Fig. 3. Tubes 74 and 75 are thyratrons. Assume thyratron 74 to be firing. The plate current from tube 74 through resistor 84 biases the grid of thyratron 75 to a sufficiently positive value to cause a voltage pulse over lines 5—8 from the counter 4 (wire 5 being positive with respect to wire 8) to ignite tube 75, whereby the tube 74 is extinguished by the action of the condenser 86. The grid of tube 74 has now, however, a sufficiently positive bias due to the current flow through the resistor 85 to permit the next voltage pulse over lines 5—8 from counter 4 (wire 5 being positive with regard to wire 8) to ignite tube 74, whereby the tube 75 will be extinguished by the action of the condenser 86. The cycle is thereafter repeated. Leads 14 and 15 being connected to a load, namely, the primary windings of transformers 91, 92, 93 and 94 of the thyratron commutator 9 shown in Figs. 1 and 5, and to the coil of the relay 111, shown in Fig. 1, a current flow will be supplied to this load only while tube 75 is firing, that is, during every other period between pulses arriving over lines 5—8. Therefore, considering counter 10 in combination with ring counter 4 and master oscillator 1, it will be seen that current flows in lines 14 and 15 for three cycles of the master oscillator, then is off for the next three cycles, etc.

Figure 5:
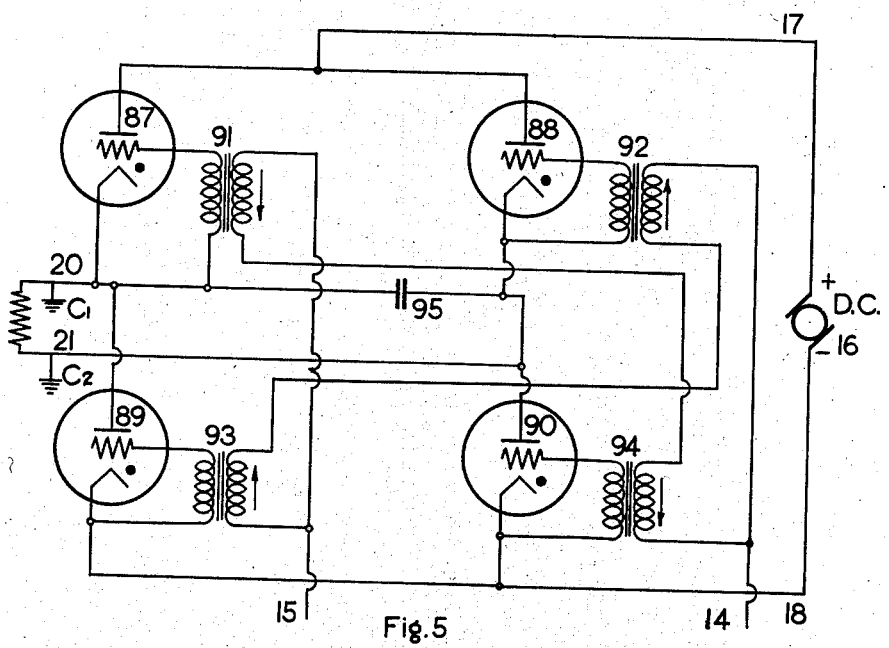
Fig. 5 is a circuit diagram of the arc discharge or thyatron commutator unit shown at 9 in Fig. 1.

Fig. 5 shows the current-switching commutator 9, connected to the D. C. source 16 by lines 17 and 18, to the counter 10 of Fig. 4 by lines 14 and 15, and to the electrodes C1 and C2 by lines 20 and 21. This commutator may comprise four large current carrying arc discharge or thyratron tubes 87, 88, 89 and 90, which are biased so that each thyratron will fire only when a positive voltage pulse is applied to its grid. The primary windings of transformers 91, 92, 93 and 94 are supplied with an approximately square wave current from lines 14 and 15, as may be seen from graph e of Fig. 1A. The secondary winding of each transformer is thus caused to develop a sharp voltage pulse when current flow is initiated in the primary over lines 14—15, and one of the opposite polarity when said current flow is discontinued. The grids of tubes 87 and 90 are connected to the secondary windings of the transformers so as to receive pulses of what shall be called positive polarity when the primaries are supplied with current, that is, at a time when a current of an increasing intensity flows through said primaries, while the grids of tubes 88 and 89 are connected to receive pulses of negative polarity during this same time. On the other hand, when the supply of current to the primaries is discontinued, that is, at a time when a current of a decreasing intensity is flowing through said primaries, the grids of tubes 88 and 89 will receive pulses of positive polarity, while those of tubes 87 and 90 will receive pulses of negative polarity. Assume tubes 87 and 90 to be firing, their grids having received a positive voltage pulse from transformers 91 and 94. In such case, the next positive pulse will be on the grids of tubes 88 and 89 from transformers 92 and 93, and will cause these tubes to fire, which action will extinguish tubes 87 and 90 by means of condenser 95. The voltage applied to the load (electrodes C1 and C2) will alternate in direction, since when tubes 87 and 90 are firing, line 20 is positive with respect to line 21, and when tubes 88 and 89 are firing, line 21 is positive with respect to line 20. In this way, direct current from generator or battery 16 is commutated to give a substantially square wave form current to the electrodes C1 and C2 at a frequency of one-sixth of that of the master oscillator 1.

Figure 6:
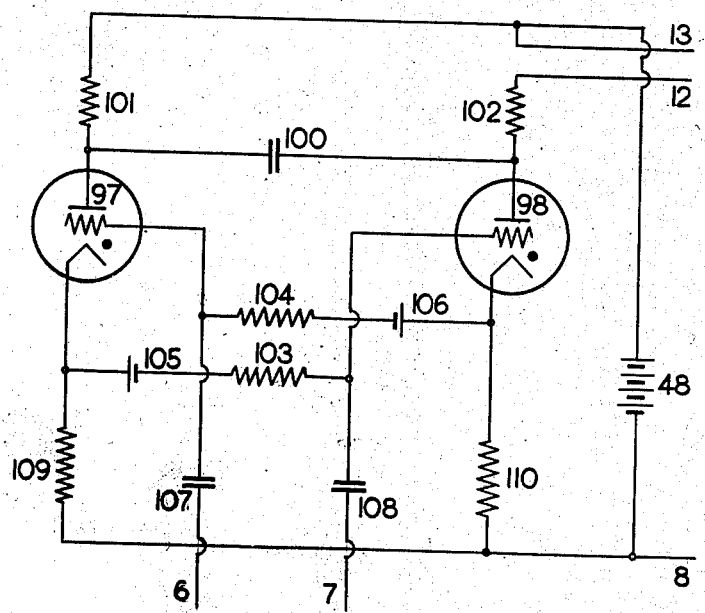
Fig. 6 is a circuit diagram of the relay operator unit shown at 11 in Fig. 1.

Fig. 6 shows an arrangement of the relay operator 11. Tubes 97 and 98 are small arc discharge tubes or thyratrons. If tube 98 is ignited, the flow of current in resistance 110 biases the grid of tube 97 so that a voltage pulse over lines 6—8 (wire 6 being positive with regard to wire 8) causes tube 97 to ignite, the resulting surge through condenser 100 extinguishing the tube 98. When the tube 97 is firing, the flow of current through resistance 109 in turn biases tube 98 so that a voltage pulse over lines 7—8 ignites tube 98, whereby the cycle is continuously repeated. Since the tube 98 is passing current only in the interval beginning with the arrival of the voltage pulse over lines 7—8 and ending with the arrival of the voltage pulse over lines 6—8, a current flows in lines 12—13 to relay 19 only during said interval.

We claim as our invention:

1. In a system of electrical exploration, a commutator circuit comprising arc discharge tubes, a source of direct current connected to said circuit, a source of controlled frequency voltage pulses connected to said circuit, grounded current electrodes connected to said circuit, means for discharging said tubes by applying thereto said voltage pulses, whereby the direction of the current flowing between the current electrodes is reversed, an indicating device, grounded potential electrodes connected to the terminals thereof, first relay means actuated by said voltage pulses for reversing the connections between the potential electrodes and the indicating device in synchronism with the reversals of the current flowing between the current electrodes, and second relay means actuated by said voltage pulses to short-circuit said indicating device during the current reversal periods.

2. In a system for electrical exploration, a source of direct current, an indicating device, current electrodes and potential electrodes in circuit with said source and said device, respectively, an electronic commutator comprising an even plurality of arc discharge tubes in the circuit between said source and said current electrodes, inductive means for biasing the grids of said tubes, said inductive means being arranged for half of said tubes to give a positive bias change in response to a rise of current therethrough, and for the other half of said tubes to give a positive bias change in response to a fall of current therethrough, condenser means connected between grid and filament elements of said two groups of tubes to extinguish one of said groups when the other is ignited, means for producing unidirectional voltage pulses at a controlled constant frequency, means for applying said pulses to said inductive biasing means, whereby said two groups of tubes are alternately ignited, and a reversing substantially square wave form current is passed between the current electrodes, a relay-operated reversing switch between the potential electrodes and the indicating device, and means to apply said voltage pulses to the winding of said relay, whereby the connections between the potential electrodes and the indicating device are reversed in synchronism with the reversals of the current flowing between the current electrodes.

3. In an electrical exploration system consisting of a first circuit comprising a source of direct current, grounded current electrodes, and an electronic commutator adapted to reverse periodically the direction of the current between said electrodes, and a second circuit comprising grounded potential electrodes, an indicating device, first relay means for reversing the connections between said potential electrodes and said indicating device, and second relay means for short-circuiting said indicating device, means for producing a continuous series of unidirectional voltage pulses of a predetermined constant frequency, means for selecting from said series a pulse recurring at a periodic subfrequency thereof, means for converting said pulse into an actuating pulse for the electronic commutator, means for applying said actuating pulse to said commutator, thereby periodically reversing the direction of the current between the current electrodes, means for applying said pulse to said first relay means, thereby reversing the connections between the potential electrodes and the indicating device in synchronism with the reversals of the current between the current electrodes, means for selecting from said series of pulses at least two other pulses recurring at periodic equal subfrequencies thereof, means of converting said pulses into a single actuating pulse for said second relay means, and means for applying said pulse to said second relay means, whereby said indicating device is short-circuited in synchronism with the reversals of the current between the current electrodes.

DAVID SAVILLE MUZZEY, Jr.
ROBERT DU WAYNE MILLER.